United States Patent [19]

Sydansk

[11] Patent Number: 4,844,168

[45] Date of Patent: * Jul. 4, 1989

[54] DELAYED IN SITU CROSSLINKING OF ACRYLAMIDE POLYMERS FOR OIL RECOVERY APPLICATIONS IN HIGH-TEMPERATURE FORMATIONS

[75] Inventor: Robert D. Sydansk, Littleton, Colo.

[73] Assignee: Marathon Oil Company, Findlay, Ohio

[*] Notice: The portion of the term of this patent subsequent to Aug. 4, 2004 has been disclaimed.

[21] Appl. No.: 153,860

[22] Filed: Feb. 9, 1988

Related U.S. Application Data

[63] Continuation-in-part of Ser. No. 939,660, Dec. 9, 1986, Pat. No. 4,744,418, which is a continuation-in-part of Ser. No. 822,709, Jan. 27, 1986, Pat. No. 4,683,949, which is a continuation-in-part of Ser. No. 807,416, Dec. 10, 1985, abandoned.

[51] Int. Cl.⁴ .......................................... E21B 33/138
[52] U.S. Cl. .................................. 166/270; 166/294; 166/295; 166/300
[58] Field of Search ............... 166/270, 294, 295, 300; 405/264; 523/130, 132

[56] References Cited

U.S. PATENT DOCUMENTS

| | | | |
|---|---|---|---|
| 2,248,028 | 7/1941 | Prutton | 166/295 |
| 3,302,717 | 2/1967 | West et al. | 166/295 X |
| 3,306,870 | 2/1967 | Eilers et al. | 166/295 X |
| 3,504,746 | 4/1970 | Freifeld et al. | 166/295 |
| 3,762,476 | 10/1973 | Gall | 166/294 |
| 3,938,594 | 2/1976 | Rhudy et al. | 166/308 |
| 3,978,928 | 9/1976 | Clampitt | 166/294 |
| 3,981,363 | 9/1976 | Gall | 166/270 |
| 4,018,286 | 4/1977 | Gall et al. | 166/295 |
| 4,039,029 | 8/1977 | Gall | 166/294 |
| 4,606,407 | 8/1986 | Shu | 166/270 |
| 4,644,073 | 2/1987 | Mumallah et al. | 166/295 X |

Primary Examiner—George A. Suchfield
Attorney, Agent, or Firm—Jack L. Hummel; Rodney F. Brown

[57] ABSTRACT

A process for treating a region in a high-temperature hydrocarbon-bearing formation with a gel for hydrocarbon recovery applications. The gel is prepared by mixing a single aqueous gelation system at the surface comprising a solution of a polyvalent metal crosslinking agent and an unhydrolyzed acrylamide polymer. The system is injected into a desired treatment region of the high-temperature formation wherein the polymer is hydrolyzed in situ. The gelation system is then gelled to completion in the treatment region.

18 Claims, 2 Drawing Sheets

*Fig. 1*
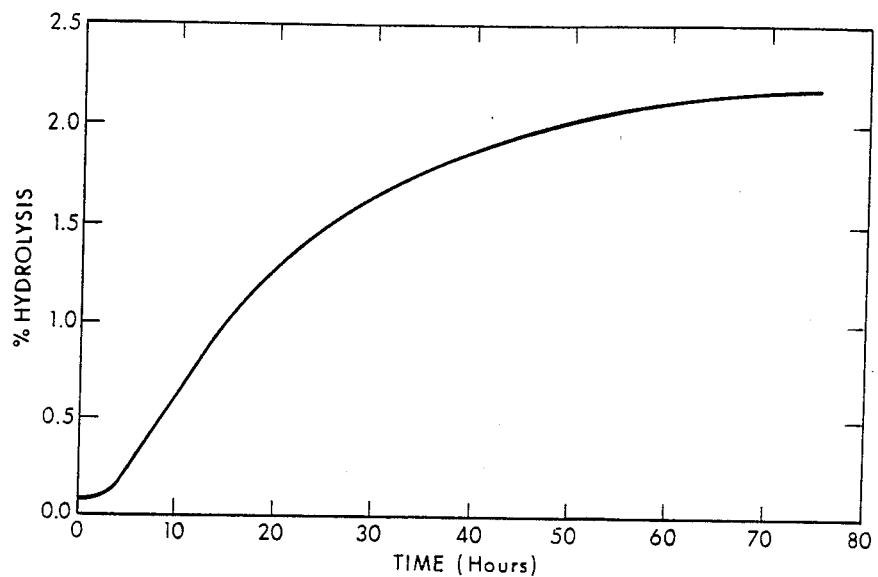
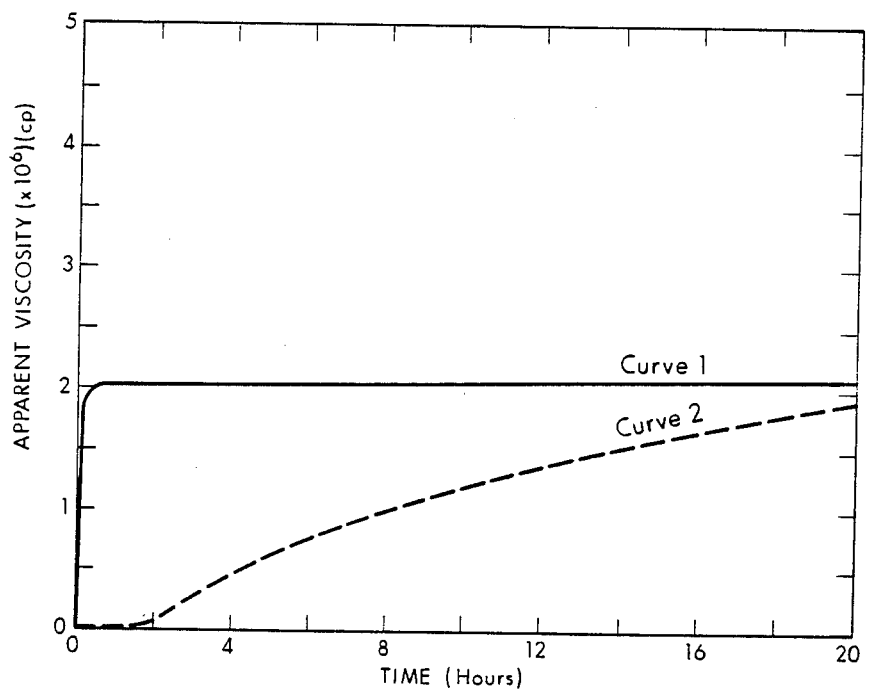
*Fig. 2*

DELAYED IN SITU CROSSLINKING OF ACRYLAMIDE POLYMERS FOR OIL RECOVERY APPLICATIONS IN HIGH-TEMPERATURE FORMATIONS

This is a continuation-in-part application of copending application Ser. No. 939,660 filed on Dec. 9, 1986, and issued as U.S. Pat. No. 4,744,418 on May 12, 1988, which is a continuation-in-part application of Ser. No. 822,709 filed on Jan. 27, 1986, and issued as U.S. Pat. No. 4,683,949 on Aug. 4, 1987, which is a continuation-in-part application of application Ser. No. 807,416 filed on Dec. 10, 1985, now abandoned.

BACKGROUND OF THE INVENTION

1. Technical Field

The invention relates to an oil recovery process and more particularly to a process of placing an acrylamide polymer gel in a high-temperature formation for oil recovery applications.

2. Description of Related Art

Polymer gels have potential application to a number of processes designed to improve oil recovery formations. Such processes include conformance improvement, cementing, and fracturing. Conformance improvement can be necessary when one is flooding or producing a formation exhibiting poor vertical or areal conformance. Poor vertical conformance results from the vertical juxtaposition of relatively high permeability geologic regions to relatively low permeability regions within a subterranean fromation. Poor areal conformance results from the presence of high permeability streaks and high permeability anomalies within the formation matrix, such as vertical fractures and networks of the same, which have very high permability relative to the formation matrix.

Fluids generally exhibit poor flow profiles and sweep efficiencies in subterranean formations having poor vertical or areal conformance. Poor conformance is particularly a problem where vertical heterogeneity, fracture networks or other structural anomalies are in fluid communication with a subterranean wellbore across which fluids are injected or produced.

A number of attempts to remedy conformance problems exist. U.S. Pat. Nos. 3,762,476; 3,981,363; 4,018,286; and 4,039,029 to Gall or Gall et al describe various processes wherein crosslinked polymer gel compositions are formed from gelation systems in high permeability regions of subterranean formations to reduce the permeability therein. However, in practice, prior art conformance treatments employing in situ gelation have proven unsatisfactory because the gelation systems are extremely difficult to regulate once the system is injected into a formation.

Controlling the gelation reaction is a particularly acute problem in high-temperature formations because the high temperatures can induce excessive gelation of the system as soon as it contacts the formation. As a result, the gel sets up before it can sufficiently penetrate the treatment region and the region does not achieve uniform permeability reduction. This effect diminishes the degree of conformance improvement which one can realize with conventional gel treatments in high-temperature formations.

A need exists for a gelation process wherein a gelation system gels in situ at a slow, controlled rate, even at high formation temperatures. A need exists for a process wherein a gelation system substantially delays gelation until it has effectively penetrated the desired treatment region of a subterranean hydrocarbon-bearing formation at which time the system sets up as a uniform immobile gel.

SUMMARY OF THE INVENTION

The present invention satisfies the above-described needs which are neither recognized nor satisfied by the prior art. The present invention provides a process for improving hydrocarbon recovery from a high-temperature subterranean hydrocarbon-bearing formation penetrated by a production or injection well. The process improves vertical and areal conformance in the formation and correspondingly improves flow profiles and sweep efficiencies of injected or produced fluids in the formation. The process also has general utility to wellbore cementing applications.

These objectives and others are achieved by the polymer gelation process of the present invention. The process comprises preparing a single aqueous gelation system at the surface containing an aqueous solvent, a water-soluble unhydrolyzed acrylamide polymer, and a polyvalent metal crosslinking agent. The resulting gelation system is injected into a high-temperature subterranean region in which one desires to reduce pemeability. The polymer is hydrolyzed in situ and then crosslinked in situ to produce a viscous continuous single-phase gel.

Once the gel sets up, fluids may be injected into or produced from the hydrocarbon-bearing regions of the formation in fluid communication with the wellbore. The gel in place is immobile, i.e., it is substantially incapable of flowing from the treatment region and is substantially permanent and resistant to in situ degradation.

An integral part of the present invention is the discovery that an unhydrolyzed acrylamide polymer does not substantially gel (i.e., crosslink) unless a significant number of amide constituents in the polymer are hydrolyzed to carboxylate constituents. Since heat promotes the hydrolysis reaction, one can utilize high formation temperatures to hydrolyze the polymer in situ. Gelation of the polymer is delayed until the hydrolysis reaction has proceeded to a sufficient degree. The extent of the delay is a function of the rate of the hydrolysis reaction.

Delayed gelation enables one to penetrate a high-temperature treatment region with a gelation system before the gel sets up. Heretofore, it has been difficult, if not impossible, to adequately place conventional acrylamide polymer gelation systems in many high-temperature regions because the heat promotes rapid crosslinked gelation of the polymer and causes the gel to set up before it can sufficiently penetrate the treatment region.

BRIEF DESCRIPTION OF DRAWINGS

FIG. 1 plots the hydrolysis rate of unhydrolyzed polyacrylamide as described in Example IV.

FIG. 2 plots the functional relationship between temperature, gelation rate and the degree of hydrolysis in the polyacrylamide as described in Example V.

DESCRIPTION OF PREFERRED EMBODIMENTS

Figure 3:
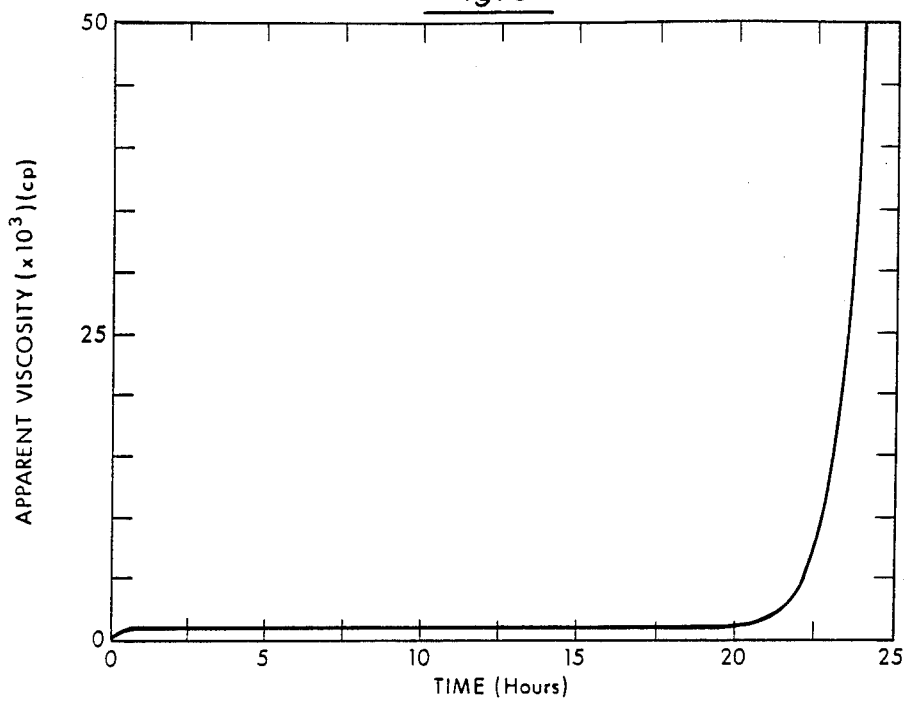
FIG. 3 plots the gelation rate of an unhydrolyzed polyacrylamide as described in Example VI.

The gelation system utilized in the present invention is a solution comprising a water-soluble unhydrolyzed acrylamide polymer. The term "acrylamide polymer" refers to any polymer in which one or more of the linked monomeric groups are acrylamide groups. Thus, the term acrylamide polymer comprises polymers which contain only linked acrylamide monomeric groups (i.e. polyacrylamide) as well as polymers which contain one or more other types of linked monomeric groups in addition to acrylamide groups (i.e., copolymers, terpolymers, etc. of acrylamide).

"Unhydrolyzed acrylamide polymer" as used herein is defined as an acrylamide polymer which has less than about 1.0 mole percent of the total monomeric groups in the polymer hydrolyzed. Hydrolysis is a reaction which converts the amide constituent contained within a monomeric acrylamide group to a carboxylate constituent. "Partially hydrolyzed acrylamide polymer" as defined herein is an acrylamide polymer which has at least 1.0 mole percent of the total monomeric groups in the polymer hydrolyzed.

In most conventional acrylamide polymerization processes, about 2 to 3 mole percent hydrolysis is considered an acceptable level of impurity in the unhydrolyzed polymer product. In the past, such product was commonly termed unhydrolyzed polyacrylamide or simply polyacryamide because this level of hydrolyzed impurity was generally not believed to significantly impact the utility of the polymer for oil recovery applications. However, the present invention recognizes that acrylamide polymer gelation processes in high-temperature environments have a much higher probability of success if the level of hydrolyzed impurity in the unhydrolyzed acrylamide polymer as initially added to the gelation system is strictly limited to a level below about 1.0 mole percent and preferably below about 0.1 mole percent.

In addition to the above-recited limitation, the present unhydrolyzed acrylamide polymer has an average molecular weight in the range of about 10,000 to about 50 million and preferably about 100,000 to about 20 million, and most preferably about 200,000 to about 15 million. The polymer concentration in the gelation system can be about 500 ppm up to the solubility limit of the polymer in the solvent or the rheological constraints of the system. The preferred polymer concentration is about 10,000 ppm to about 80,000 ppm.

The gelation system further comprises a polyvalent metal crosslinking agent. The polyvalent metal crosslinking agent of the present invention is defined as a salt or a complex of a trivalent or quatravalent metal cation in an aqueous solution wherein the metal cation is capable of crosslinking a partially hydrolyzed acrylamide polymer. Exemplary polyvalent metal crosslinking agents useful in the practice of the present invention are salts or complexes of $Al^{3+}$, $Fe^{3+}$, $Cr^{3+}$, $Ti^{4+}$. Preferred crosslinking agents of the present invention are salts or complexes of $Al^{3+}$ or $Cr^{3+}$, including $AlCl_3$, $CrCl_3$ and $CrAc_3$ (chromic triacetate).

The solvent of the gelation system is an aqueous liquid, such as deionized water, potable water, fresh water, or brine having a total dissolved solids concentration up to the solubility limit of the solids in water. Inert fillers known in the art, although not preferred, may also be added to the gelation system to reinforce the subsequent gel if desired. Such fillers include crushed or naturally fine rock material or glass beads.

The gelation system is formed by admixing the polymer, crosslinking agent, solvent and any optional inert fillers at the surface to form a single injectable gelation solution. Surface admixing broadly encompasses inter alia mixing the system in bulk at the surface prior to injection or simultaneously mixing the system at or near the wellhead by in-line mixing means while injecting the system into a wellbore for present gel treatment. The weight ratio of polymer to crosslinking agent in the system is about 1:1 to about 500:1, preferably about 2.5:1 to about 200:1, and most preferably about 4:1 to about 50:1.

The practitioner of the invention injects the premixed gelation system as a single uniform slug into a wellbore in fluid communication with a desired subterranean treatment region. The gelation system is displaced into the treatment region. The treatment region is defined as either a "matrix" or an "anomaly." An "anomaly" is a volume or void space in a formation which has very high permeability relative to the matrix. As used herein, the term, anomaly, may encompass wellbores. An anomaly further encompasses terms such as high permeability streaks, fractures, fracture networks, vugs, solution channels, caverns, washouts, cavities. The "matrix" is substantially the remainder of the formation volume characterized as essentially homogeneous, continuous, sedimentary reservoir matreial free of anomalies and often competent.

It has been found that acrylamide polymers do not form detectable gels in the presence of a crosslinking agent if the polymer remains less than about 1.0 mole percent and preferably less than about 0.1 mole percent hydrolyzed. It is believed that the carboxylate constituents are the crosslinking sites in the polymer and that the polymer cannot gel if there are too few crosslinking sites in the polymer, i.e., less than about 1.0 mole percent and preferably less than about 0.1 mole percent based on the total number of monomeric groups in the polymer. If the polymer is partially hydrolyzed above this level, the polymer gels at predictable rates. U.S. Pat. No. 4,683,949 shows gelation rates for a number of different polymers and conditions and is incorporated herein by reference.

The practitioner of the present invention utilizes this information to prevent the complete gelation of a gelation system until it has uniformly penetrated a treatment region. Thus, the present process is particularly applicable to high-temperature formations where it is extremely difficult to prepare a gelation system having a sufficiently slow gelation rate to enable placement of the system in the treatment region.

High temperature formations as defined herein are formations having temperatures above about 60° C., preferably above about 80° C. and most preferably above about 100° C. at the depth of the treatment region. Such temperatures typically cause premature gelation of known polymer gelation systems and subsequent unwanted plugging of portions of the wellbore, wellbore face or formation where it is desirable to maintain permeability.

According to the present invention, the gelation system is ungelled or at most only partially gelled when it reaches the desired treatment region. A "partially gelled" gelation system as defined herein is at least somewhat more viscous than a polymer solution which has the same polymer concentration as the gelation system, but does not contain a crosslinking agent. A partially gelled gelation system resists entering a less permeable region where it is desired to maintain permeability, but the system is sufficiently fluid such that it readily enters a desired treatment region.

The crosslinking agent of the partially gelled system has reacted incompletely with the polymer with the result that neither all of the polymer nor all of the crosslinking agent in the gelation system is totally consumed by the crosslinking reaction. The partially gelled system is capable of further crosslinking to completion resulting in the desired gel without the addition of more crosslinking agent.

Once the gelation system is in place in a desired high-temperature treatment region, the heat of the treatment region promotes in situ hydrolysis of the amide constituents in the acrylamide groups of the polymer. After a sufficient number of amide constituents have been hydrolyzed to carboxylate constituents, crosslinking of the gelation system can proceed to completion at an orderly rate. "Crosslinked to completion" means that the gelation system is incapable of further crosslinking because one or both of the required reactants in the initial system are consumed. Further crosslinking is only possible if either polymer, crosslinking agent, or both are added to the gelation system.

This, gelation of the unhydrolyzed acrylamide polymer gelation system is believed to be a two-step mechanism. The first step is the heat promoted polymer hydrolysis reaction and the second step is the polymer crosslinking reaction. The practitioner delays complete crosslinking of the gelation system until the system has fully penetrated the desired treatment region by performing the hydrolysis reaction in situ. Significant gelation of the system due to crosslinking generally only occurs after at least more than about 1.0 mole percent of the monomeric groups in the polymer hydrolyze. Gelation may also be a function of the particular distribution of carboxylate groups along the polymer chain.

The gelation rate can generally be delayed such that complete gelation does not occur for up to a week or more from the time the gelation system is formulated and injected into the desired treatment region. Even under extremely unfavorable in situ conditions, the gelation rate can be delayed such that complete gelation does not occur for at least 4 hours, preferably at least 12 hours, and more preferably at least 24 hours or more from the time of formulation.

The final completed "gel" as defined herein is a continuous three-dimensional crosslinked polymeric network having an ultra-high molecular weight. The gel confines the liquid solvent within the solid polymeric network. The fusion of a liquid and a solid component into a single-phase system provides the gel with a unique phase behavior.

Gels employed by the present invention are immobile once in place, i.e., the gels have sufficient structure so as not to propagate from the confines of a plugged region into a less permeable region in the formation adjoining the plugged region once in place "Plugging" is defined as a substantial reduction permeability in a region of a formation. Although some of the gels employed herein may qualitatively appear to flow under the force of gravity when unconfined on the surface at ambient atmospheric conditions, all of the gels employed herein must have sufficent structure to be immobile within the confines of the treatment region.

The present process is applicable to a number of hydrocarbon recovery applications. According to one embodiment, the process is applicable to conformance treatment of formations which are in fluid communication with an injection or production well. The gel plugs anomalies such as streaks of relatively high permeability, fractures or fracture networks in direct communication via the anomaly with an injection well or a production well. The gel is also applicable to the plugging of high permeability zones of the matrix. Conformance treatment of regions in direct communication with a production well by the process of the present invention can effectively improve the hydrocarbon productivity of the well or decrease the water to hydrocarbon ratio of the produced fluids.

According to another embodiment, the present process is applicable to cement jobs. A cement job can be analogous to a conformance treatment in cases where both processes are designed to plug anomalies. A cement job generally plugs anomalies in the wellbore or near wellbore of a formation while a conformance treatment generally plugs anomalies in a formation away from the wellbore.

The cement of the present embodiment is a gelation system as prepared in the manner described above. The cement is applied according to conventional cementing methods known in the art. A rigid gel is the preferred final form for the cement composition. The present process is particularly applicable to remedial squeezecementing jobs which can also effectively improve the hydrocarbon productivity of a production well or decrease the water to hydrocarbon ratio of the produced fluids. The process is also applicable to plugging abandoned wells.

The following examples demonstrate the practice and utility of the present invention but are not to be construed as limiting the scope thereof.

EXAMPLES

The polymer solutions of the following examples are prepared by diluting aqueous polyacrylamide solutions with a fresh water solvent, i.e., Denver, Colo., U.S.A. tap water. In Examples I, II, and III, and dilute polymer solution is then combined with a crosslinking agent solution in a 0.12 liter widemouth bottle to form a 0.05 liter gelation system. The system is gelled in the capped bottle and the qualitative gel strength is determined by periodically inverting the bottle.

Examples I, II, and III are formatted as tables of data which describe the formation and maturation of different gels. Each gel is represented in a table by a single experimental run. Data include the conditions for producing the gel and the qualitative strength of the produced gel. The table displays data in a threetier format. The first tier is the values of the fixed gelation conditions which are constant and common to every run in the table. The second tier is values of the gelation conditions which vary among the different runs in the table but are constant for any given run. The third tier is the qualitative gel strength which varies as a function of time within each run and is expressed in alphabetic code.

The following gel strength code and nomenclature are useful for interpreting the tables.

Gel Strength Code

A. No detectable continuous gel formed: the bulk of the gelation system appears to have the same viscosity as a polymer solution of the same polymer concentration, but absent the crosslinking agent. However, in some cases isolated highly viscous gel balls may be present in the system.

B. Highly flow gel: the gel appears to be only slightly more viscous than a polymer solution having the same polymer concentration, but absent the crosslinking agent.

C. Flowing gel: most of the gel flows to the bottle cap by gravity upon inversion.

D. Moderately flowing gel: only a small portion (~5-10%) of the gel does not readily flow to the bottle cap by gravity upon inversion (usually characterized as a tonguing gel).

E. Barely flowing gel: the gel can barely flow to the bottle cap and/or a significant portion (>15%) of the gel does not flow by gravity upon inversion.

F. Highly deformable nonflowing gel: the gel does not flow to the bottle cap by gravity upon inversion.

G. Moderately deformable nonflowing gel: the gel deforms about half way down the bottle by gravity upon inversion.

H. Slightly deformable nonflowing gel: only the gel surface slightly deforms by gravity upon inversion.

I. Rigid gel; there is no gel surface formation by gravity upon inversion.

J. Ringing rigid gel: a tuning fork-like mechanical vibration can be felt upon tapping the bottle.

| Nomenclature | |
|---|---|
| Polymer: | Type of acrylamide polymer |
| Crosslinking Agent: | polyvalent metal salt used in preparation of ionized or complexed crosslinking agent |
| % Hydrolysis: | mole % of carboxylate groups in the acrylamide polymer molecule based on the total number of monomeric groups in the molecule |
| Polymer MW: | average molecular weight of the acrylamide polymer |
| Polymer Conc: | polymer concentration in the initial polymer solution (ppm) |
| Polymer pH: | pH of the polymer solution |
| Weight Ratio Polymer:Ions: | weight ratio of polymer to crosslinking agent ions in the gelation system |
| Metal Ion Conc: | polyvalent metal cation concentration in the gelation system |
| Temp: | gelation temperature (°C.) rt = room temperature |
| Time: | gelation time (hr) |
| Gel Code: | gel strength code |

| Example I | |
|---|---|
| Polymer MW: | 5,000,000 |
| Polymer Conc: | 20,000 |
| Temp: | 21 |
| Metal Ion Conc: | 225 |
| Weight Ratio Polymer:Ions: | 89 |
| Polymer pH: | 8 |

| Run Number | 1 | 2 | 3 |
|---|---|---|---|
| Polymer | unhydrolyzed polyacrylamide | unhydrolyzed polyacrylamide | partially hydrolyzed polyacrylamide |
| Crosslinking Agent | CrAc$_3$ | CrCl$_3$ | CrAc$_3$ |
| % Hydrolysis | <0.1 | <0.1 | 30.0 |
| Time | Gel Code | | |
| 1.0 | A | A | D |
| 3.0 | A | A | F |
| 7.0 | A | A | G |
| 24 | A | A | H |
| 48 | A | A | I |
| 96 | A | A | I |
| 168 | A | A | J |
| 1680 | A | A | J |

No gelation whatsoever is evident in Runs 1 and 2, now even localized gel ball formation. Gelation in Run 3 proceeds at a rapid controlled rate.

| Example II | |
|---|---|
| Polymer: | partially hydrolyzed polyacrylamide |
| % Hydrolysis: | 30 |
| Polymer MW: | 5,000,000 |
| Polymer Conc: | 8350 |
| Polymer Solvent: | 5,000 ppm NaCl in aqueous solution |
| Temp: | rt |

| Run Number | 1 | 2 |
|---|---|---|
| Crosslinking Agent | Cr$_3$Cl$_3$ | Cr(NO$_3$)$_3$ |
| Metal Ion Conc | 52.5 | 52.5 |
| Total Ion Conc | 270 | 405 |
| Weight Ratio PHPA:Ions | 30.1 | 20.6 |
| Time | Gel Code | |
| 1.0 | A | A |
| 4.0 | A | A |
| 9.0 | A | A |
| 24 | A | A |
| 48 | A | A |
| 96 | A | A |
| 336 | A | A |
| 672 | A | A |

Crosslinking in both runs occurs so rapidly that local gel balls form around the crosslinking agent solutions as they are added to the polymer solution preventing effective mixing and continuous gel formation.

| Example III | |
|---|---|
| Polymer: | unhydrolyzed polyacrylamide |
| % Hydrolysis: | <0.1 |
| Polymer MW: | 270,000 |
| Polymer Conc: | 50,000 |
| Crosslinking Agent: | CrAc$_3$ |
| Metal Ion Conc: | 1498 |
| Weight Ratio Polymer:Ions: | 7.5 |

| Run Number | 1 | 2 | 3 | 4 | 5 |
|---|---|---|---|---|---|
| Temp | 43 | 60 | 74 | 85 | 104 |
| Time | Gel Code | | | | |
| 0 | A | A | A | A | A |
| 7.0 | A | A | A | A | A |
| 24 | A | A | A | A | B |
| 48 | A | A | A | A | I |
| 168 | A | A | A | A | I |
| 300 | A | A | B | G | I |
| 600 | A | B | B | I | I |
| 800 | A | B | C | I | I |

Crosslinking of the unhydrolyzed polyacrylamide gelation system does not occur at 43° C. as shown in Run 1. In comparison, the gelation systems of Runs 3-5 produce gels having utility for many subterranean high-temperature applications, i.e., >60° C. Furthermore, gelation of these systems can be delayed for 24 hours or more at high temperatures which enables one to place the gelation systems of Runs 3-5 into high-temperature formations. Run 2 indicates that the utility of the present process approaches a lower temperature limit around 60° C.

Examples I and II indicate that gelation of partially hydrolyzed polyacrylamide gelation systems proceeds at room temperature, but often at rapid controlled rates or even excessive uncontrolled rates. For this reason, partially hydrolyzed acrylamide polymer gelation systems can be unsuitable for treatments of high-temperature formations where slower gelation rates are required.

In contrast, Examples I and III indicate that gelation of unhydrolyzed polyacrylamide gelation systems does not proceed at room temperature, but proceeds at an orderly controlled rate at high temperatures. Thus, unhydrolyzed acrylamide polymer gelation systems are particularly suitable for treatments of high-temperature formations.

EXAMPLE IV

An unhydrolyzed polyacrylamide having a molecular weight of 11,000,000 is maintained in solution at 82° C. for 80 hours. FIG. 1 shows the rate of the hydrolysis reaction under these conditions. Significant hydrolysis does not occur for about 4 hours. Hydrolysis does not exceed 1.0 mole percent until about 15 hours have elapsed.

EXAMPLE V

Two separate gelation solutions are prepared by mixing 5,000,000 molecular weight acrylamide polymers in Denver, Colo. U.S.A. tap water at a concentration of 20,000 ppm. A chromic triacetate crosslinking agent is added to the gelation solution at a polymer to crosslinking agent ion weight ratio of 20:1. The first gelation solution (Curve 1) contains partially hydrolyzed polyacrylamide which is 1.5 mole percent hydrolyzed and the second gelation solution (Curve 2) contains unhydrolyzed polyacrylamide which is <0.1 mole percent hydrolyzed. Both gelation solutions are maintained at identical reaction conditions of 110° C. and 3445 kPa.

FIG. 2 shows the gelation rate of the two solutions as a function of time. Apparent viscosity at 0.1 radians per second and 30% strain is the measure of gelation rate. As Curve 2 of FIG. 2 shows the unhydrolyzed polyacrylamide substantially delays gelation of the gelation system for two hours at high temperature. This delayed gelation time would enable one to place the gelation system containing unhydrolyzed polyacrylamide in many treatment regions according to the present invention. In contrast, it would be extremely difficult, if not impossible, to place the gelation system containing the partially hydrolyzed polyacrylamide of Curve 1 in a treatment region under the same conditions.

EXAMPLE VI

A polymer gelation system is prepared containing an unhydrolyzed polyacrylamide and a chromic triacetate crosslinking agent in solution. The polymer concentration in the solution is 40,000 ppm and the weight ratio of polymer to crosslinking agent is 6:1. The polymer has a molecular weight of 180,000 and initially has less than 0.1 mole percent of the amide constituents hydrolyzed to carboxylate constituents.

The system is maintained over time at a constant temperature of 104° C. The gelation rate of the system (as indicated by apparent viscosity) is recorded as a function of time. The results are plotted in FIG. 3. Apparent viscosity is determined at 0.1 radians per second and 100% strain.

FIG. 3 indicates that gelation of the system is delayed for more than 20 hours according to the process of the present invention. For many treatment applications, this is sufficient time to inject an adequate volume of a gelation system into a desired high-temperature formation before the gel sets up.

EXAMPLE VII

A clean sandstone plug at residual oil saturation with normal decane is 2.54 cm long, 7.62 cm in diameter, and has a permeability of 290 md. An acrylamide polymer gelation system is initially injected into the plug at a high rate to saturate the plug. Thereafter, the system is continuously injected into the plug at a constant temperature of 104° C. and a constant injection rate of 0.5 cm$^3$/hr. Injection proceeds for 16 hours until a total of 1.6 pore volumes of the gelation system are injected into the plug under there conditions.

The gelation system contains a chromic triacetate crosslinking agent and an unhydrolyzed polyacrylamide in solution. The polymer concentration in the solution is 60,000 ppm and the weight ratio of polymer to crosslinking agent is 7.5:1. The polymer has a molecular weight of 180,000 and initially has less than 0.1 mole percent of the amide constituents hydrolyzed to carboxylate constituents.

Figure 4:
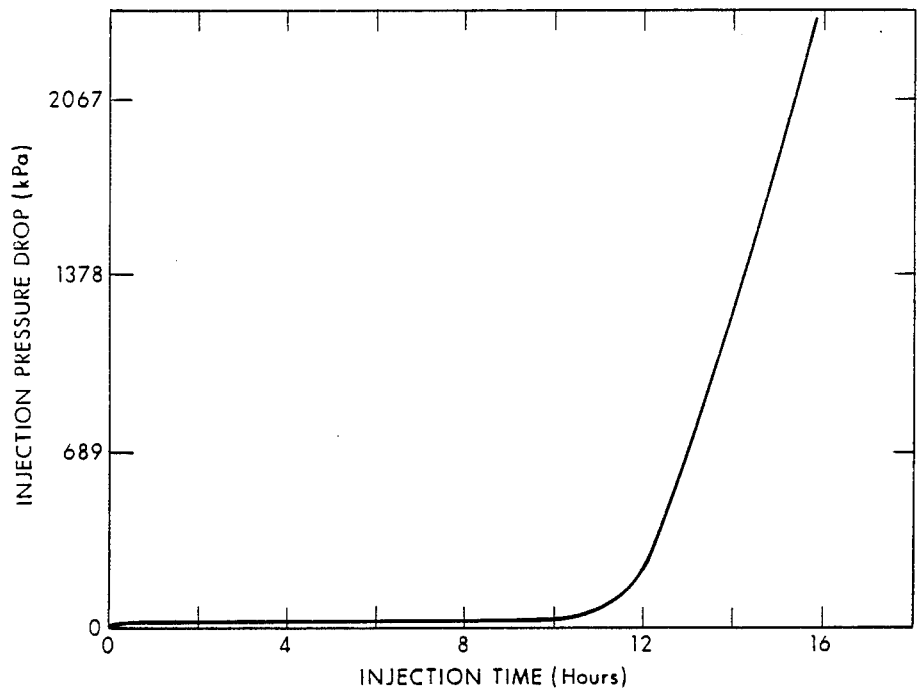
FIG. 4 plots the injection pressure drop of a gelation system as a function of time as described in Example VII.

The injection time is recorded as a function of the injection pressure drop. The results are shown in FIG. 4. The results indicate that the present process substantially delays gelation of the injected gelation system for about 10 to 12 hours. This delay allows the practitioner adequate time to place the system in a high-temperature formation before experiencing unacceptably high injection pressure drops.

While the foregoing preferred embodiments of the invention have been described and shown, it is understood that alternatives and modifications, such as those suggested and others, may be made thereto and follow in the scope of the invention.

I claim:

1. A process for plugging a region of a high-temperature hydrocarbon-bearing formation below an earthen surface with a cross-linked acrylamide polymer gel wherein said formation is penetrated by a wellbore in communication with said region, the process comprising:
   (a) admixing a gelation system at said earthen surface comprising an aqueous solvent, an unhydrolyzed acrylamide polymer made up of monomeric groups, and a polyvalent metal crosslinking agent, wherein less than about 1.0 mole percent of the monomeric groups in said unhydrolyzed acrylamide polymer contain a carboxylate constituent based on the total number of the monomeric groups in said polymer and wherein said polyvalent metal crosslinking agent is a salt or a complex of a trivalent or quatravalent metal cation capable of crosslinking a partially hydrolyzed acrylamide polymer;
   (b) injecting said gelation system into said treatment region of said formation wherein the formation has a temperature of at least about 60° C.
   (c) hydrolyzing said polymer in said region at said formation temperature such that more than about 1.0 mole percent of the monomeric groups in said polymer contain a carboxylate constituent based on the total number of the monomeric groups in the polymer; and (d) crosslinking said gelation system in said region to substantial completion to form said continuous immobile crosslinked acrylamide polymer gel which plugs at least a portion of said treatment region.

2. The process of claim 1 wherein polymer gel substantially plugs said treatment region for conformance treatment.

3. The process of claim 2 wherein said treatment region is an anomaly in said hydrocarbon-bearing formation.

4. The process of claim 3 wherein said anomaly is a fracture or a fracture network.

5. The process of claim 2 wherein said treatment region is a matrix in said hydrocarbon-bearing formation.

6. The process of claim 1 wherein said treatment region is in said wellbore and said polymer gel cements said wellbore.

7. The process of claim 1 wherein said metal cation is selected from the group consisting of $Cr^{3+}$, $Fe^{3+}$, $Al^{3}$, $Zr^{4+}$, and mixtures thereof.

8. The process of claim 1 wherein said metal cation is $Cr^{3+}$ or $Al^{3+}$.

9. The process of claim 1 wherein less than about 0.1 mole percent of the monomeric groups in said unhydrolyzed acrylamide polymer, based on the total number of the monomeric groups in said polymer, contain a carboxylate constituent.

10. The process of claim 1 wherein said wellbore is a hydrocarbon production wellbore and said gel substantially reduces the water to hydrocarbon ratio of fluid produced from said wellbore.

11. The process of claim 1 wherein said wellbore is a hydrocarbon production wellbore and said gel substantially increases hydrocarbon productivity from said wellbore.

12. The process of claim 1 wherein said wellbore is an injection wellbore.

13. The process of claim 1 wherein the temperature of said formation is greater than about 80° C.

14. The process of claim 1 wherein the crosslinking agent is selected from the group consisting of $CrCl_3$, $AlCl_3$, and chromic triacetate.

15. The process of claim 1 wherein said crosslinking agent is chromic triacetate.

16. The process of claim 1 wherein the elapsed time from said admixing to said crosslinking to substantial completion is greater than about 12 hours.

17. The process of claim 1 wherein the elapsed time from said admixing to said crosslinking to substantial completion is greater than about 24 hours.

18. The process of claim 1 wherein the temperature of said formation is greater than about 100° C.

* * * * *